United States Patent
Marion

(10) Patent No.: US 7,613,353 B2
(45) Date of Patent: Nov. 3, 2009

(54) METHOD OF COLOR IMAGE PROCESSING TO ELIMINATE SHADOWS AND REFLECTIONS

(75) Inventor: Vincent Marion, Boulogne-Billacourt (FR)

(73) Assignee: Thales, Neuilly-sur-Seine (FR)

( * ) Notice: Subject to any disclaimer, the term of this patent is extended or adjusted under 35 U.S.C. 154(b) by 645 days.

(21) Appl. No.: 10/528,447

(22) PCT Filed: Sep. 12, 2003

(86) PCT No.: PCT/EP03/50403

§ 371 (c)(1),
(2), (4) Date: Mar. 18, 2005

(87) PCT Pub. No.: WO2004/027710

PCT Pub. Date: Apr. 1, 2004

(65) Prior Publication Data

US 2006/0045330 A1   Mar. 2, 2006

(30) Foreign Application Priority Data

Sep. 20, 2002   (FR) .................................. 02 11684

(51) Int. Cl.
*G06K 9/00* (2006.01)
*G06K 9/40* (2006.01)
(52) U.S. Cl. ...................... 382/254; 382/163
(58) Field of Classification Search ......... 382/162–167, 382/171, 173, 178, 168, 174
See application file for complete search history.

(56) References Cited

U.S. PATENT DOCUMENTS 6,140,997 A * 10/2000 Tanaka ......................... 345/604
6,163,321 A * 12/2000 Kiyokawa .................... 345/589
7,133,069 B2 * 11/2006 Wallach et al. ............ 348/218.1
7,158,671 B2 * 1/2007 Yamazoe et al. ............ 382/167
7,194,128 B1 * 3/2007 Payton ........................ 382/166

OTHER PUBLICATIONS

Cucchiara et al, "Improving Shadow Suppression in Moving Object Detection with HSV Color Information", 2001 IEEE Intelligent Transportation Systems Conference Proceedings—Oakland (CA), USA—Aug. 25-29, 2001.*
Scanlan et al, "A Shadow Detection And Removal Algorithm For 2-D Images", Acoustics, Speech, and Signal Processing, 1990. ICASSP-90., 1990 International Conference on Apr. 3-6, 1990 pp. 2057-2060 vol. 4.*

(Continued)

*Primary Examiner*—Vikkram Bali
*Assistant Examiner*—Andrae S Allison
(74) *Attorney, Agent, or Firm*—Lowe Hauptman Ham & Berner, LLP

(57) ABSTRACT

A method of color image processing comprises at least the following steps: the color image is converted into an intermediate image comprising components that depend solely on the H and S components of the original image in an HSV or HLS representation; the intermediate image comprising at least two components X and Y, determined by functions especially of the H component, these functions taking the same value when the H component is zero or equal to one; a new image comprising only one component is generated from the intermediate image, the component of this new image being a function of the components of the intermediate image. The disclosed method can be applied especially to the heightening of contrast in remote surveillance, and to image processing before segmentation in mobile robotics.

11 Claims, 3 Drawing Sheets

OTHER PUBLICATIONS

Carevic et al, "Region-Based Coding of Color Images Using Karhunen-Loeve Transform", Graphical Models and Image Processing, vol. 59, No. 1, January, pp. 27-38, 1997.*

Herodotou et al, "A Color Segmentation Scheme for Object-Based Video Coding", Advances in Digital Filtering and Signal Processing, 1998 IEEE Symposium on Jun. 5-6, 1998 pp. 25-29.*

Gamba et al, "A Fast Algorithm for Target Shadow Removal in Monocular Colour Sequences", Image Processing, 1997. Proceedings., International Conference on vol. 1, Oct. 26-29, 1997 pp. 436-439 vol. 1.*

Cucchiara et al, "Analysis and Detection of Shadows in Video Streams: A Comparative Evaluation", Computer Vision and Pattern Recognition, 2001. CVPR 2001. Proceedings of the 2001 IEEE Computer Society Conference on vol. 2, 2001 pp.II-571-II-576 vol. 2.*

Cucchiara et al, "Detecting Moving Objects, Ghosts, and Shadows in Video Streams", IEEE Transactions on Pattern Analysis and Machine Intelligence, vol. 25, No. 10, Oct. 2003.*

Li et al, "Real-time video object segmentation using HSV space", Image Processing. 2002. Proceedings. 2002 International Conference on vol. 2, Sep. 22-25, 2002 pp.II-85-II-88 vol. 2.*

Funt et al, "Recovering Shading from Color Images", ECCV'92, Second European Conference on Computer Vision, pp. 124-132, May, 1992.*

Chindaro et al, "Directional Properties of Colour Co-occurrence Features for Lip Location and Segmentation", AVBPA 2001, LNCS 2091, pp. 84-89, 2001.*

Chindaro et al; "Directional Properties of Colour Co-occurence Features For Lip Location And Segmentation"; Audio- and Video-Based Biometric Person Authentication. $3^{rd}$ International Conference, AVBPA 2001, Proceedings (Lecture Notes in Computer Science vol. 2091), Audio- and Video-Based Biometric Person Authentication, $3^{rd}$ International Conference, AVBPA; pp. 84-89; XP002242333; 2001, Berlin, Germany.

Cucchiara et al; "Improving Shadow Suppression in Moving Object Detecetion With HSV Color Information" ITSC 2001; 2001 IEEE Intelegent Transportation Systems Proceedings; Oakland CA USA; Aug. 25-29, 2001; pp. 334-339; XP010555793.

Gamba et al; "A Fast Algorithm For Target Shadow Removal in Moncular Colour Sequences" ; Proceedings, International Conference On Image Processing (CAT 97CB36144), Proceedings Of International Conference On Image Processing, Santa Barbara, CA, USA; Oct. 26-29, 1997; pp. 436-447, vol. 1; XP010254201.

* cited by examiner

METHOD OF COLOR IMAGE PROCESSING TO ELIMINATE SHADOWS AND REFLECTIONS

RELATED APPLICATIONS

The present application is based on International Application No. PCT/EP2003/050403, filed Sep. 12, 2003, and claims priority from, French Application Number 0211684, filed Sep. 20, 2002, the disclosure of which is hereby incorporated by reference herein in its entirety.

BACKGROUND OF THE INVENTION

The present invention relates to a method for the processing of color images to eliminate shadows. It can be applied especially to the heightening of contrast in remote surveillance, and to image processing before segmentation in mobile robotics.

In applications of mobile robotics, operations of image segmentation are carried out. Segmentation makes it possible to detect and localize the edges of roads for example. The shadows of trees on these roads or reflections from puddles generate parasitic segments. These shadows and reflections constitute parasitic information. The invention makes it possible to eliminate this parasitic information by carrying out a processing of color images that are to be segmented.

SUMMARY OF THE INVENTION

An object of the invention is a method of color image processing, comprising the following steps:
  the color image is converted into an intermediate image comprising components that depend solely on the H and S components of the original image in an HSV or HLS representation,
  the intermediate image comprising at least two components X and Y, determined by functions especially of the H component, these functions taking the same value when the H component is zero or equal to one;
  a new image comprising only one component is generated from the intermediate image, the component of this new image being a function of the components of the intermediate image.

The method according to the invention has many advantages:
  it can be used to extract the useful information from a color image with a minimum loss of information;
  it can be used to compress the information in a monochromatic image;
  it is totally non-parametrical and can therefore be applied to all images with the same efficiency, without any particular setting, whatever the scene.

After a processing operation of this kind, it is possible to use monochromatic image segmentation algorithms while at the same time exploiting the wealth of information of a color image in getting rid of errors due to shadows or reflections of water films.

BRIEF DESCRIPTION OF THE DRAWINGS

The invention shall now be described in great deal in the context of a particular example of a practical implementation. In this description, reference shall be made to the figures of the appended drawings, of which.

MORE DETAILED DESCRIPTION

Figure 1:
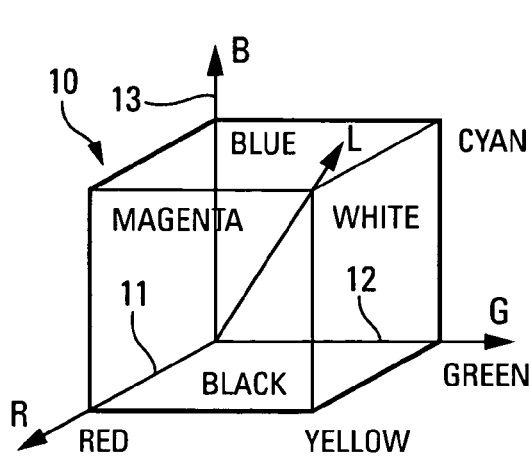
FIG. 1 represents the RGB color space.

Referring to FIG. 1, a color image is generally described in the RGB (red, green, blue) space. The color of each pixel is represented therein by three components R (red), G (green), B (blue). These components may be represented on three axes 11, 12, 13 in Cartesian coordinates. The primary colors, cyan, blue, magenta, red, yellow and green, form the corners of a cube 10 in this space. Black and white form opposite corners of this cube. The segment connecting these points is a main diagonal of this cube on which only the luminance L varies.

Figure 2:
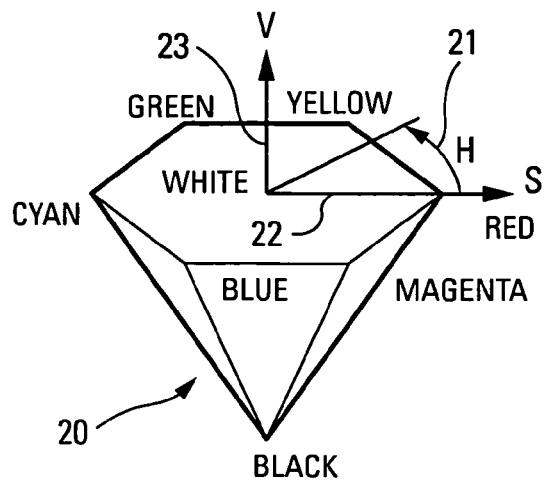
FIG. 2 represents the HSV color space.

Referring now to FIG. 2, other color spaces exist. In the HSV (hue, saturation, value) space, color is represented by three components H, S, and V. These components may be represented in a referential system of cylindrical coordinates. The H component is represented by an angle 21. The S and V components are represented on two axes 22 and 23. The H component is the hue. This component makes it possible for example to distinguish red and yellow. The S component is saturation, namely the purity of the color. This component makes it possible for example to distinguish red and pink. The V component is the value or intensity, namely the quantity of light. This component makes it possible, for example, to distinguish between dark gray and light gray, or again between dark red and light red. It is assumed hereinafter in the description that the components H, S, V are normalized between 0 and 1. The following explanations may be transposed in an obvious way if these components are not normalized between 0 and 1.

The passage from the RGB representation to the HSV representation is done according to known analytical formulae. The primary colors and black form a six-faced pseudo-cone (hexcone) 20. The plane with a constant value of V corresponds to the projection of the RGB cube parallel to its main diagonal.

The Applicant has noted that the value or intensity V does not carry a great deal of useful information because the elements of the image to be segmented are distinguished far more by their spectral properties than by their reflection or their total absorption. Furthermore, the value or intensity V carries information that leads the segmentation algorithms into error, since shadowed and non-shadowed zones of a same object (a road for example) have very different intensities (with variation of intensity at the source). Similarly, a water film on the road gives rise to a strong reflection and, therefore, a very different intensity from that of a dry or simply wet portion on the same road (with variation of intensity by modification of the properties of reflection).

In order to eliminate the information on value or intensity, the color image is converted into an intermediate image in which the V component is absent. This intermediate image includes components that depend solely on the H and S components of the original image in an HSV representation.

This makes it possible to eliminate cast shadows and reflections due to water films. This furthermore has the advantage of reducing the quantity of information present in the image (by the elimination of a component).

The conversion from the RGB space to the HSV space gives rise to singularities of hue for certain points. Thus, for the achromatic points (R=G=B), a small variation in RGB may lead to a big variation in H. Furthermore, for the points in the vicinity of the axis of origin of H (G=B, R>(G+B)/2), a small disturbance in the components R, G, B may lead to major variations in H (a change in the sign of H).

Furthermore, the distribution of the converted values is not uniform. Digitization may lead to peaks and holes in the distribution of the values. In other words, the information is noise-ridden around V=0.

Advantageously, components X and Y are used in the intermediate image. These components are determined by functions especially of the H component, and take the same value when the H component is zero or equal to one. Thus, the similarities induced by the H component, proper to the system of cylindrical coordinates, are eliminated.

These functions are written as $G_X(H)$ and $G_Y(H)$. They therefore verify the following relationships: $G_X(0)=G_X(1)$ and $G_Y(0)=G_Y(1)$. The components X and Y are then determined by:

$$X=G_X(H)$$

$$Y=G_Y(H)$$

For example, the following functions may be used:

$$G_X(H)=\cos(2\pi H-\phi)$$

$$G_Y(H)=\sin(2\pi H-\phi)$$

where $\phi$ is a constant.

A third component can be added to this intermediate image: saturation S. Thus, in the intermediate image, there is hue information H and saturation information S, while at the same time the singularities have been eliminated.

Advantageously, it is possible to combine hue information H and saturation information S in only two components of the intermediate image. To this end, the components X and Y are determined by functions not only of the H component but also of the S component. In the same way as above, these functions take the same value when the H component is zero or equal to one. Furthermore, these functions tend toward zero when the S component tends toward zero.

These functions are written as $G'_X(H,S)$ and $G'_Y(H,S)$. They therefore verify the following relationships:

$$G'_X(0, S) = G'_X(1, S)$$
$$G'_Y(0, S) = G'_Y(1, S)$$
$$\begin{vmatrix} G'_X(H, S) \to 0 \\ S \to 0 \end{vmatrix}$$
$$\begin{vmatrix} G'_Y(H, S) \to 0 \\ S \to 0 \end{vmatrix}$$

For example, it is possible to use a product of two independent functions respectively of the S component and of the H component:

$$G'_X(H,S)=F_X(S)\times G_X(H)$$

$$G'_Y(H,S)=F_Y(S)\times G_Y(H)$$

The functions $F_X(S)$, $F_Y(S)$ of the S component are functions tending toward zero when the S component tends toward zero. These functions may be, for example, the identity function (for example $F_X(S)=S$) or the square function (for example $F_X(S)=S^2$). Preferably, monotonic and continuous functions will be used.

Figure 3:
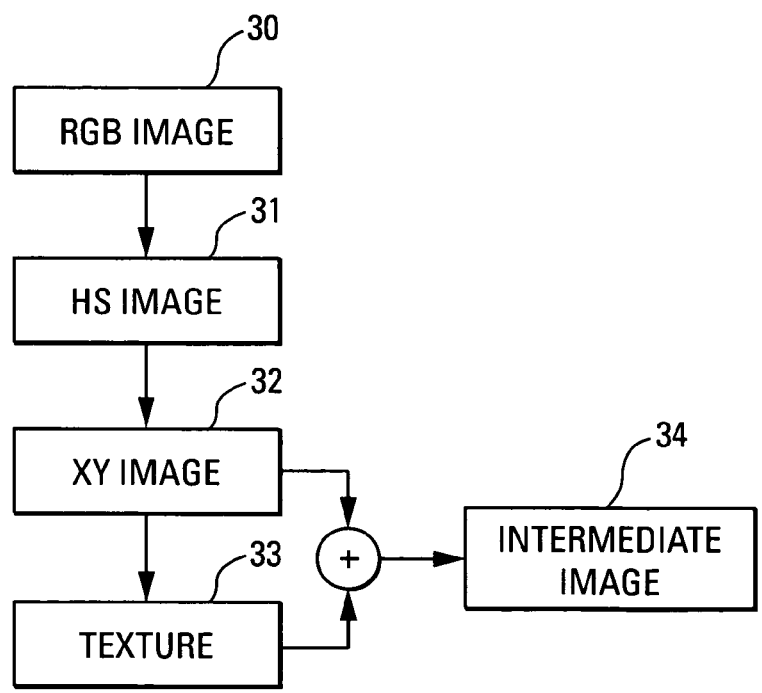
FIG. 3 is a graph showing the steps of implementation of the invention according to an advantageous mode using texture attributes.

Referring now to FIG. 3, in an advantageous variant, an intermediate image 34 is generated. This intermediate image furthermore comprises texture attributes. The texture attributes are determined from an image 32 comprising the components X and Y for example, and not from the initial color image 30 encoded in the RGB space. Indeed, it is sought first of all to eliminate the shadows and the reflections.

For example the initial color image 30 is converted into an image 31 with two components, the H and S components. Then, the image 31 is converted into an image 32 that comprises the two components X and Y defined here above. For each pixel of the image 32, texture attributes are determined. These attributes may be, for example, the attributes defined by Haralick. Of course, other attributes may be used, through a fractal approach for example. An image 33 is obtained with texture attributes. The components X and Y and the texture attributes are combined to form the intermediate image 34, to which the remaining processing operations are applied. It is thus possible to apply a multitude of transformations to the intermediate image without being preoccupied by shadows and reflections.

In order to obtain a monochromatic image, a new image is generated from the intermediate image obtained. In other words, a transformation is applied to the intermediate image so as to keep only one component. The single component of the new image is a function of the components of the intermediate image.

Figure 4:
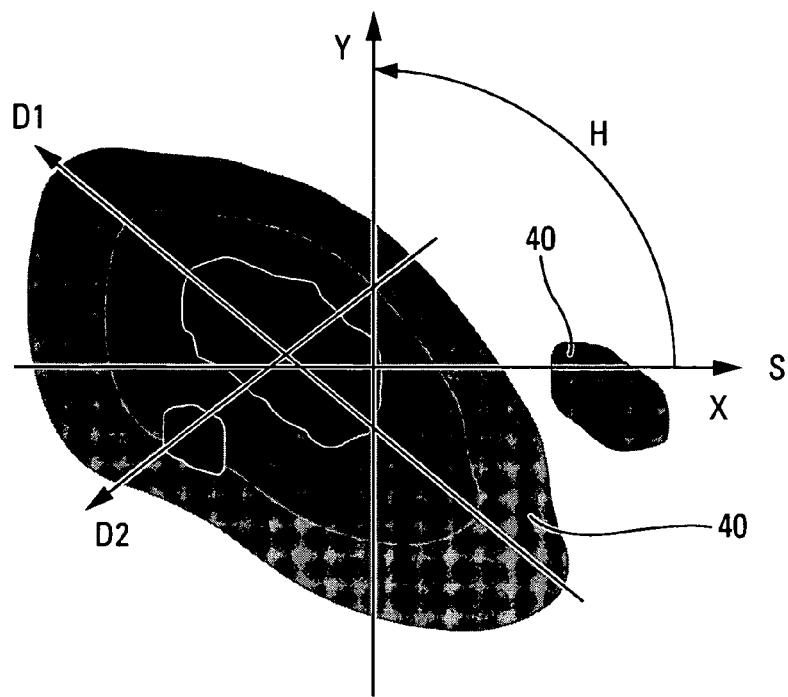
FIG. 4 exemplifies a result of a Karhunen-Loève transformation operation.

Referring now to FIG. 4, in an advantageous embodiment of the invention, the new image is generated by keeping only the first component of the Karhunen-Loève transformation.

This transformation is applied in the referential system D1, D2 of the eigen vectors are associated with the covariance matrix of the pixels of the intermediate image. There is thus a passage from the X, Y referential system to the D1, D2 referential system. As can be seen in the exemplary distribution of the pixels 40 of the image in these referential systems, this transformation enables the decorrelation of the information present in the image. The first component D1 is the most discriminatory component, i.e. it is this component that maximizes the information. This facilitates discrimination in the segmentation processing operations applied to the new image.

According to an alternative mode of implementation, a linear approximation of the Karhunen-Loève transformation is applied, not the Karhunen-Loève transformation itself. To this end, the Karhunen-Loève transformation is applied to a representative set of images (for example eight images). The images of this set have characteristics similar to the images to which it is sought to apply the linear approximation. An average is then taken of the changes in referential system obtained by the exact Karhunen-Loève transformation. A average change of referential system is obtained, and this referential will be used as an approximation of the Karhunen-Loève transformation.

According to another mode of implementation, the new image is generated by projecting the components of the intermediate image in the plane in which the dynamic range or the mean standard deviation is the greatest.

Figure 5:
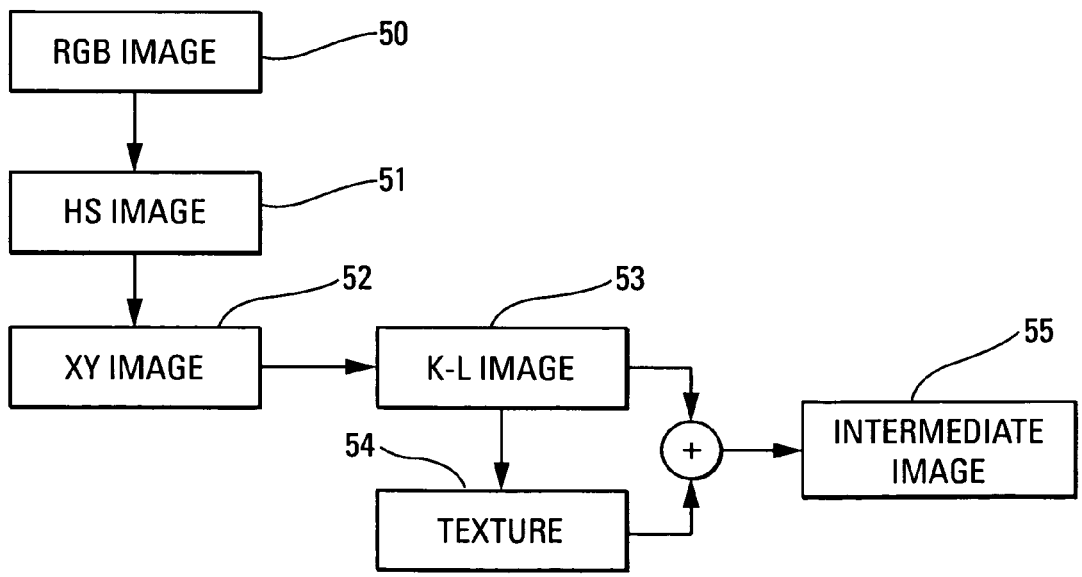
FIG. 5 shows an alternative implementation of the example shown in FIG. 3.

Reference is now made to FIG. 5 which represents an alternative mode of implementation with respect to the example shown in FIG. 3. In the same way, from the initial color image 50, an image with two components, the H and S components, is generated. Then an image 52 comprising the two components X and Y is generated. Then the Karhunen-Loève transformation (or a linear approximation of this transformation) is applied to the components X and Y. The first component of the result of this transformation is kept to form an image 53 comprising a single component. Texture attributes of this image 53 are determined. These texture attributes form an image 54. The single component of the image 53 and the texture attributes (image 54) are combined to form the intermediate image 55 comprising color information and texture information. The remaining processing operations are applied to this intermediate image 55.

The Karhunen-Loève transformation can thus be applied a second time, for example to obtain a monochromatic image.

Figure 6:
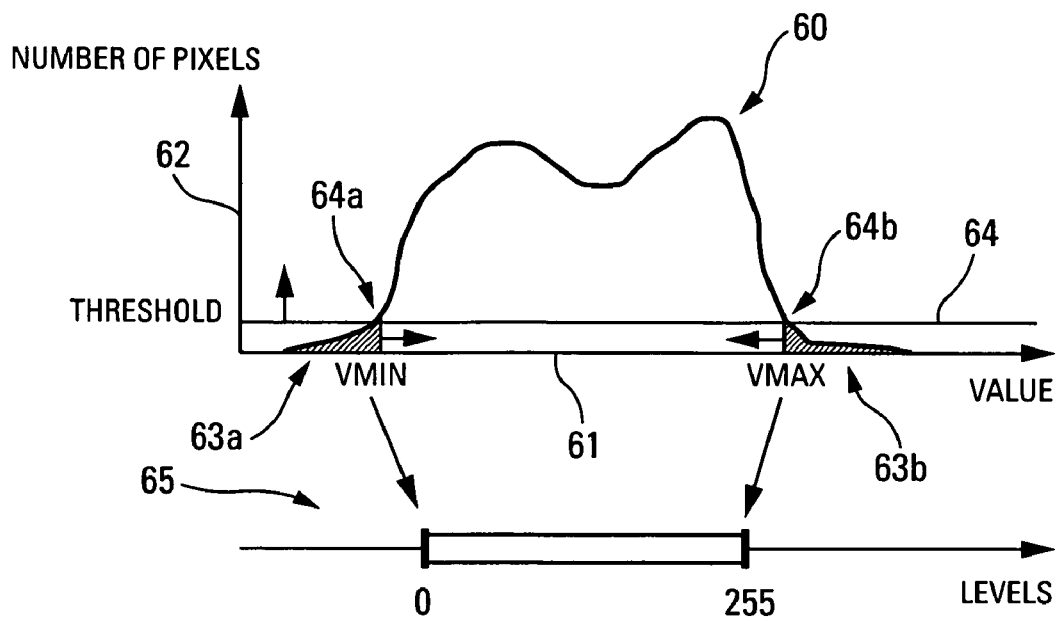
FIG. 6 is an exemplary histogram of a new image obtained by the implementation of the invention to which a filtering of pixels and an adjustment of the dynamic range is applied.

Reference is now made to FIG. 6 which represents an exemplary histogram 60 of the component of the monochromatic image. The x-axis 61 represents the values taken by the pixels. The y-axis 62 represents the number of pixels in the image having a determined value. A non-negligible range of the values is taken up by pixels that are very small in number at the two extreme ends 63a, 63b of the histogram.

Advantageously the lightest and the darkest pixels, which are present in very small numbers, are filtered. This makes it possible to avoid any loss of dynamic range through the occupying of a major part of the range of values by pixels that carry no additional information. In other words, the darkest and the lightest pixels, which represent a determined fraction of the total number of pixels of the image, are filtered. To this end, a number of pixels to be eliminated from the image is determined. This number of pixels may be expressed as a percentage of the total number of pixels of the image. A minimum value VMIN and a maximum value VMAX of the pixels are determined, so that the number of pixels of the image whose value is below VMIN or above VMAX is as close as possible to the number of pixels to be eliminated. For all the pixels whose value is beyond the values VMIN and VMAX, the value of the corresponding limit is assigned.

The values VMIN and VMAX may be determined iteratively. During an iteration, a value 64 of the y-axis 62 is selected in going through the axis from the bottom to the top. The smallest value VMIN and the greatest value VMAX of the y-axis 61, corresponding to the intersections 64a, 64b of the histogram 60 with the selected value 64, are determined. The operation is stopped when the number of pixels to be eliminated for the selected value is greater than the determined fraction of the total number of pixels of the image.

The values taken by the component of the monochromatic image (the most discriminatory component) are distributed in a non-normalized range. In preparation for subsequent processing operations (such as segmentation, viewing, etc.), these values may be brought by linear transformation into a normalized interval, for example [0.1], or [0.255]. This linear transformation 65 may be applied, as illustrated in FIG. 6, after the pixels have been filtered in small numbers at the two limits of the histogram. Thus, for an image encoded on 8 bits, the value VMIN is brought to a level zero, and the value VMAX is brought to a level 255.

Figure 7:
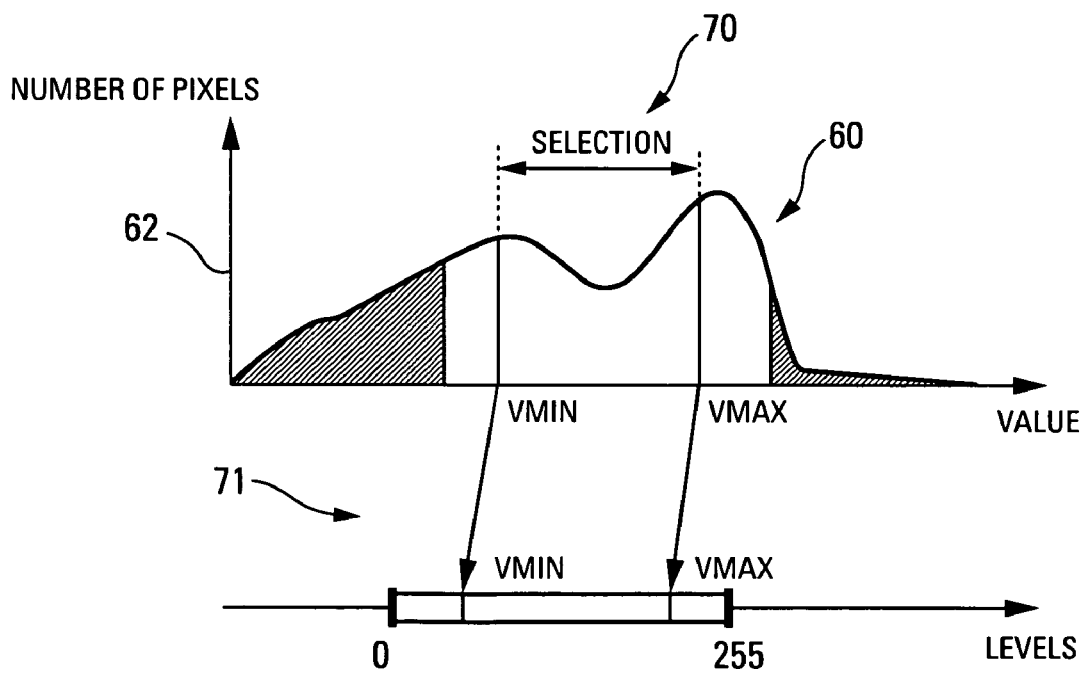
FIG. 7 shows another exemplary adjustment of the dynamic range.

Referring now to FIG. 7, an advantageous variant is described of the adjustment of the values used to process the image by giving greater or lesser importance to the contrast in a selected zone.

In this advantageous variant, the beginning of the processing is carried out in a similar way. The parameters of the Karhunen-Loève transformation (or a linear approximation of this transformation) are determined according to the selected zone of the image only. This transformation is then applied to the entire image. The pixels of the selected zone occupy only a part 70 of the histogram 60.

Similarly, a linear transformation can be applied to bring the values of the pixels into a normalized interval. Advantageously, the parameters of the linear transformation are determined so as to bring the minimum value VMIN and the maximum value VMAX of the selected zone between two predetermined levels NMIN and NMAX. These levels NMIN and NMAX are strictly contained in the normalized interval. For example, for an image encoded on 8 bits, the normalized interval being [0.255], a value of 32 can be taken for NMIN and 224 for NMAX.

These parameters are used to apply a linear transformation to the entire image, the levels of the pixels being limited (for pixels outside the selected zone) in order to be included in the normalized interval.

This advantageous variant is used to obtain efficient discrimination in the regions similar to the selected zone, while at the same time keeping other information out of this selected zone.

What is claimed is:

1. A method for converting an original color image into a monochromatic image said conversion being made with a minimal lose of information, the method comprising the following steps:

a computer for performing the steps of:

converting the original color image made of pixels, each pixel being represented by hue H, saturation S and value V components in a color space, or by hue H, luminescence L and saturation S components in a HLS color space into an intermediate image made of pixels, each pixel being represented by components X and Y depending solely on the H and S components of the pixel in the original color image; wherein components X and Y are functions of the H component determined by:

$X=G_X(H)$ and $Y=G_Y(H)$;

wherein these functions verify the following relationships:

$G_X(0)=G_X(1)$ and $G_Y(0)=G_Y(1)$;

(b) generating a new monochromatic image from the intermediate image;

wherein the intermediate image each pixel is represented only by a component D1; D1 being a function of components X and Y of the pixel in the intermediate image.

2. The method according to claim 1, wherein components X and Y are functions of the H and S components determined by:

$G'_X(H,S)$ and $G'_Y(H,S)$, these functions verify the following relationships:

$G'_X(0,S)=G'_X(1,S)$ and $G'_Y(0,S)=G'_Y(1,S)$ $G'_X(H,S) \to 0$ and $G'_Y(H,S) \to 0$ $S \to 0$ $S \to 0$.

3. The method according to claim 2, wherein $G'_X(H,S)$ and $G'_Y(H,S)$ are monotonic and continuous functions of the S component.

4. The method according to claim 1, wherein the new monochromatic image is generated by applying a Karhunen-Loève transformation, or a linear approximation of this transformation, to the intermediate image and using only the most discriminatory component D1 to represent each pixel of the new image.

5. A method for processing an original color image, the method comprising the following steps:

a computer for performing the steps of:
(a) converting the original color image into an intermediate image made of pixels, each pixel having components that depend solely on hue H and saturation S components of the pixels in the original color image in an HSV or HLS representation;
wherein the intermediate image is made of pixels, each pixel comprising two components X and Y, determined by functions of the H component, theses functions take the same value when the H component is zero or equal to one;
(b) generating a new monochromatic image from the intermediate image, said new monochromatic image being made of pixels, each pixel having only one component which is a function of the components of the corresponding pixel in the intermediate image;
wherein the new monochromatic image is generated by projecting the components of the pixels of the intermediate image in a plane in which a dynamic range or mean standard deviation is the greatest.

6. The method according to claim 1, wherein a filtering is performed on the darkest and the lightest pixels, which represent a determined fraction of the total number of pixels of the new monochromatic image.

7. The method according to claim 5, wherein the dynamic range of the new image is adjusted to a total available dynamic range.

8. The method according to claim 1, wherein $G_X(H)$ and $G_Y(H)$ are defined by:

$$GX(H)=\cos(2\pi H-\phi) \text{ and } GY(H)=\sin(2\pi H-\phi);$$

where $\phi$ is a constant.

9. The method according to claim 3, wherein the new monochromatic image is generated by applying the Karhunen-Loève transformation, or a linear approximation of this transformation, to the intermediate image and using only the most discriminatory component D1 to represent each pixel of the new image.

10. The method according to claim 3, wherein the new image is generated by projecting the components of the pixels of the intermediate image in the plane in which the dynamic range or mean standard deviation is the greatest.

11. The method according to claim 1, wherein the new monochromatic image is generated from a combination of an image made of pixels having components X and Y with additional texture attributes of the image having components X and Y.

* * * * *